United States Patent [19]

Iwinski

[11] Patent Number: 5,720,886
[45] Date of Patent: Feb. 24, 1998

[54] PROCESS FOR REMOVING METAL VALUES FROM MINE WASTE WATER

[75] Inventor: Steven R. Iwinski, Juneau, Ak.

[73] Assignee: Kennecott Greens Creek Mining Company, Salt Lake City, Utah

[21] Appl. No.: 729,165

[22] Filed: Oct. 11, 1996

Related U.S. Application Data

[60] Provisional application No. 60/005,417, Oct. 12, 1995.
[51] Int. Cl.$^6$ ............................................. C02F 1/56
[52] U.S. Cl. ........................ 210/727; 210/725; 210/734; 210/911; 210/912
[58] Field of Search .............................. 210/725, 726, 210/727, 728, 733, 912, 734, 911

[56] References Cited

U.S. PATENT DOCUMENTS

| | | | |
|---|---|---|---|
| 3,947,354 | 3/1976 | Swanson et al. | 210/727 |
| 4,219,416 | 8/1980 | Ramirez et al. | 210/725 |
| 4,432,880 | 2/1984 | Talbot | 210/725 |
| 4,701,264 | 10/1987 | Braun | 210/734 |
| 4,731,187 | 3/1988 | Moriya et al. | 210/719 |
| 4,758,353 | 7/1988 | Spence et al. | 210/725 |
| 4,802,993 | 2/1989 | Katoh | 210/725 |
| 4,861,493 | 8/1989 | Jansen | 210/715 |
| 5,051,191 | 9/1991 | Rasmussen et al. | 210/912 |
| 5,093,091 | 3/1992 | Dauplaise et al. | 423/112 |
| 5,112,500 | 5/1992 | Jones | 210/728 |
| 5,207,923 | 5/1993 | Wese | 210/727 |
| 5,308,502 | 5/1994 | Brown | 210/724 |
| 5,370,800 | 12/1994 | Stevenson | 210/912 |
| 5,545,331 | 8/1996 | Guess | 210/719 |

OTHER PUBLICATIONS

Olice C. Carter, Jr. and B.J. Scheiner, "Removal of Toxic Metals from an Industrial Wastewater Using Flocculants", *Fluid Particle Separation Journal*, 4, pp. 193–196 (1991).

*Primary Examiner*—Neil McCarthy
*Assistant Examiner*—Betsey J. Morrison
*Attorney, Agent, or Firm*—Whyte Hirschboeck Dudek S.C.

[57] ABSTRACT

Mine waste water is treated to remove both dissolved and particulate metal values by an improved process, the process comprising:

A. Mixing with the mine waste water a sufficient amount of anionic polymer to combine with the dissolved and particulate metal values to form a polymer/metal particle complex, B. Mixing the polymer/metal particle complex of Step A with a source of ferric ions, e.g. ferric chloride, to form a ferric/polymer/metal particle complex, C. Mixing the ferric/polymer/metal particle complex of Step B with a source of hydroxyl ions, e.g. a solution of calcium oxide, to form a hydroxylated ferric/polymer/metal particle complex, D. Mixing sufficient flocculent, e.g. a polyacrylamide, with the complex of Step C to precipitate the complex, and E. Separating the slurry of Step D into a clean water effluent and a high density (e.g. >50% solids), low toxic sludge.

9 Claims, 7 Drawing Sheets

PROCESS FOR REMOVING METAL VALUES FROM MINE WASTE WATER

This application claims the benefit of U.S. Provisional Application Ser. No. 60/005,417, filed Oct. 12, 1995, abandoned.

FIELD OF THE INVENTION

This invention relates to a process for removing metal values from mine waste water. In one aspect, the invention relates to using an anionic polymer for removing the metal values from the waste water while in another aspect, the invention relates to a process using an anionic polymer in combination with ferric ions. In yet another aspect, the invention relates to a mine waste water treatment process that produces a high density sludge of relatively low toxicity.

BACKGROUND OF THE INVENTION

Mining operations, both underground and open pit, generate large volumes of waste water. The sources of this waste water vary, but often include one or more of process water, acid rock drainage (ARD), surface run-off, mill clean-up, and the like. This water is collected into various ponds and sumps, and eventually it is transferred to a main holding area or sump. From here the water is transferred to a water treatment plant for processing before discharge to the environment.

Mine waste water contains a myriad of components. The water typically has a dirty or turbid appearance because it is a dilute slurry comprising finely divided particulates indigenous to the mine site or a by-product of the mining operation. The concentration of this particulate matter in the water is typically between greater than zero to about 20% by volume.

In addition to the particulate matter, the mine waste water also contains dissolved values, particularly metal values such as zinc, iron, cadmium, lead, copper, and the like. The composition and concentration of these dissolved metal values will vary from mine site to mine site and with the operations of the individual mines, but typically the concentration is in the range of about 0.1 to about 300 mg/l. The total concentration of the metal values (particulate and dissolved) in the waste water is thus typically between about 0.1 and about 10,000 mg/l. The pH of the mine waste water will also vary with the mine site and its operations, but typically is between about 5.5 and about 9.

Many methods exist for treating mine waste water such that those components deemed detrimental to the environment are reduced in concentration to a level deemed safe to the environment by either removal for separate disposal or rendering them inert. Many treatment schemes are known, and typical of these is the transfer of the mine waste water, i.e. the "slurry", to a spray water tank for adjustment of the particulate concentration by either adding water to or subtracting it from the slurry. After the slurry has the desired particulate concentration, the slurry is transferred to a rapid mix tank in which a source of hydroxyl ion (e.g. a slurry of calcium oxide) is added to hydroxylate the dissolved metal values. The resulting mixture is then transferred to a static mixer in which ferric chloride or a similar reagent is added to complex with the hydroxylated metals rendering these materials more susceptible to flocculation. From the static mixture, the ferric hydroxylated metal complexes are transferred to a flocculation tank in which they are admixed with an appropriate flocculent, and then the entire mixture is transferred to a clarifier from which clean effluent is decanted from a sludge.

While these known water treatment processes for mine waste water are all efficient to one degree or another, all are susceptible to improvement, especially in view of the ever more stringent environmental regulations under which active mine sites must operate. In particular, a continuing interest exists in developing waste water treatment systems for mine waste water that produce not only water of sufficient purity for direct discharge to the environment, but also a high density low toxicity sludge that is suitable for a safe, separate disposal, e.g. to a landfill.

SUMMARY OF THE INVENTION

According to this invention the process of treating mine waste water to remove metal values, the process comprising precipitating both particulate and dissolved metal values from an aqueous media with a source of ferric ions, hydroxyl ions, and a flocculent, is improved by:

A. Mixing with the mine waste water a sufficient amount of anionic polymer to combine with the dissolved and particulate metal values to form a polymer/metal particle complex, B. Mixing the polymer/metal particle complex of Step A with a source of ferric ions to form a ferric/polymer/metal particle complex, C. Mixing the ferric/polymer/metal particle complex of Step B with a source of hydroxyl ions to form a hydroxylated ferric/polymer/metal particle complex, D. Mixing sufficient flocculent with the complex of Step C to precipitate the complex, and E. Separating the slurry of Step D into a clean water effluent and a high density, low toxic sludge.

The anionic polymer is typically admixed with the slurry in a static mixer prior to transfer to another static mixer for the addition of the ferric ions, typically in the form of ferric chloride, to the resulting polymer/metal particle complex. The ferric/polymer/metal particle complex is then typically transferred to a rapid mix tank for admixture with the source of hydroxyl ions (e.g. a slurry of lime), which is then transferred to a separate tank for flocculent addition.

DESCRIPTION OF THE PREFERRED EMBODIMENTS

The mine waste water that can be treated by the improved process of this invention is essentially any and all water that is associated with the operation of a mine. This water has varied sources, and includes water used in the operation of the mine (e.g. process and mill clean-up) and water indigenous to the mine area (e.g. surface run-off and acid rock drainage). The waste water is typically in the form of a dilute slurry, e.g. between >0 to about 20, preferably between about 4 to about 10% by volume solids (the aggregate of both metal and nonmetal values) in the form of finely divided particulates (e.g. more than about 50% of the solids pass through a 19 micron screen, and more than about 50% of the solids are retained by a 27 micron screen). The pH of the mine waste water will vary, but is typically between about 7 to about 11, preferable between about 8 to about 9.5.

Figure 1:
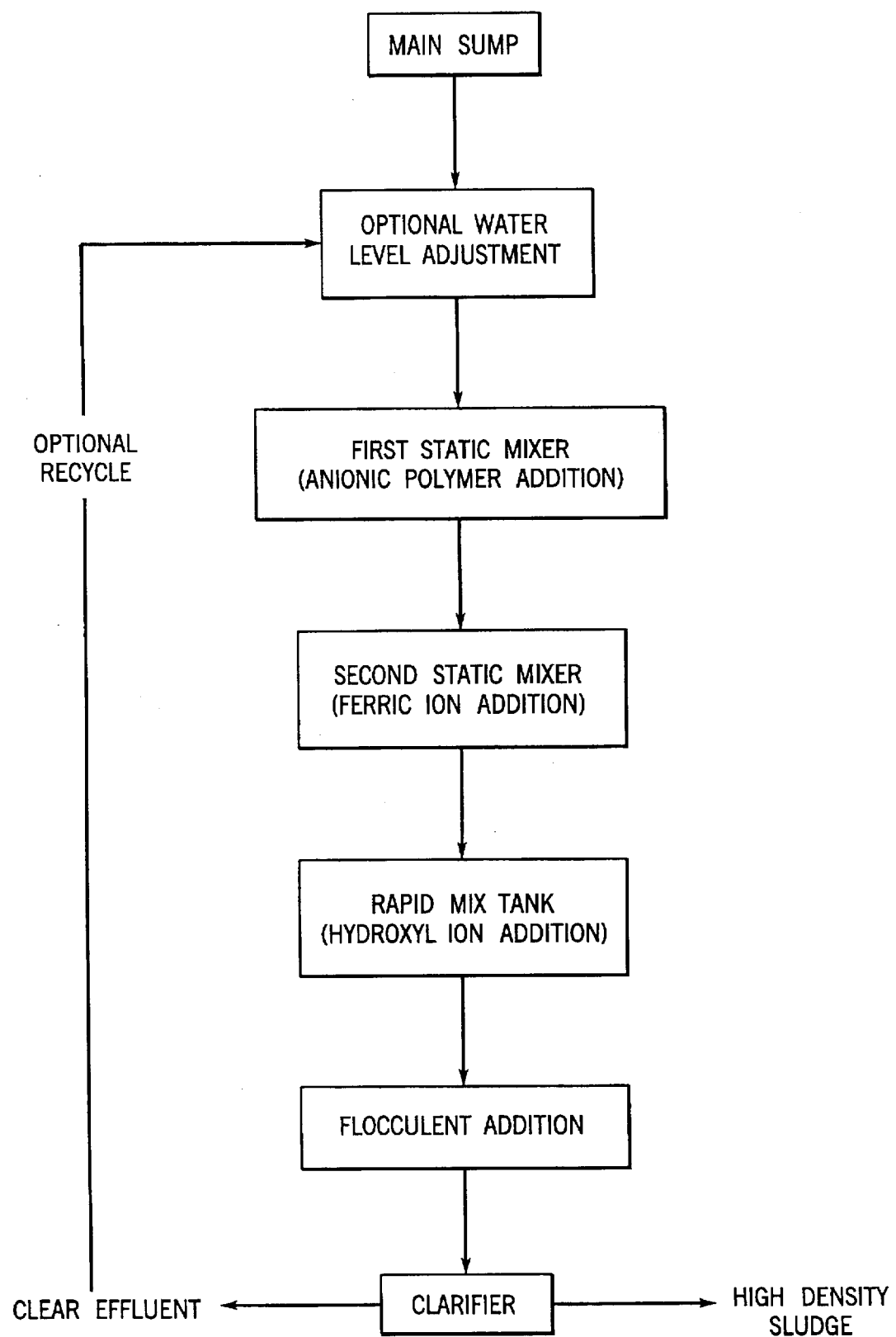
FIG. 1 is a schematic drawing of one embodiment of this invention.
Figure 2:
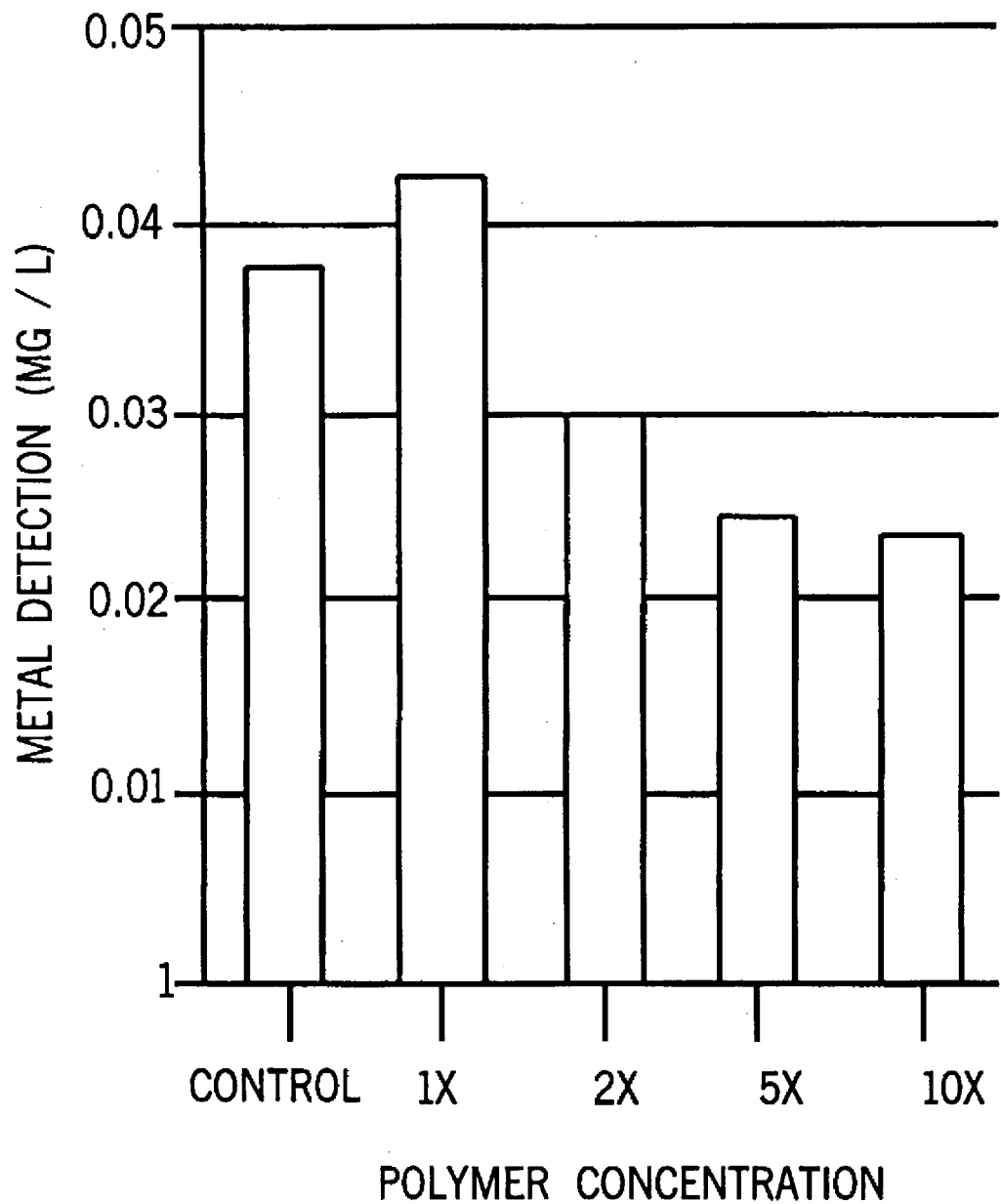
FIG. 2 is a bar graph showing the amount of cadmium detected in a water sample after treatment with various concentrations of an anionic polymer.
Figure 3:
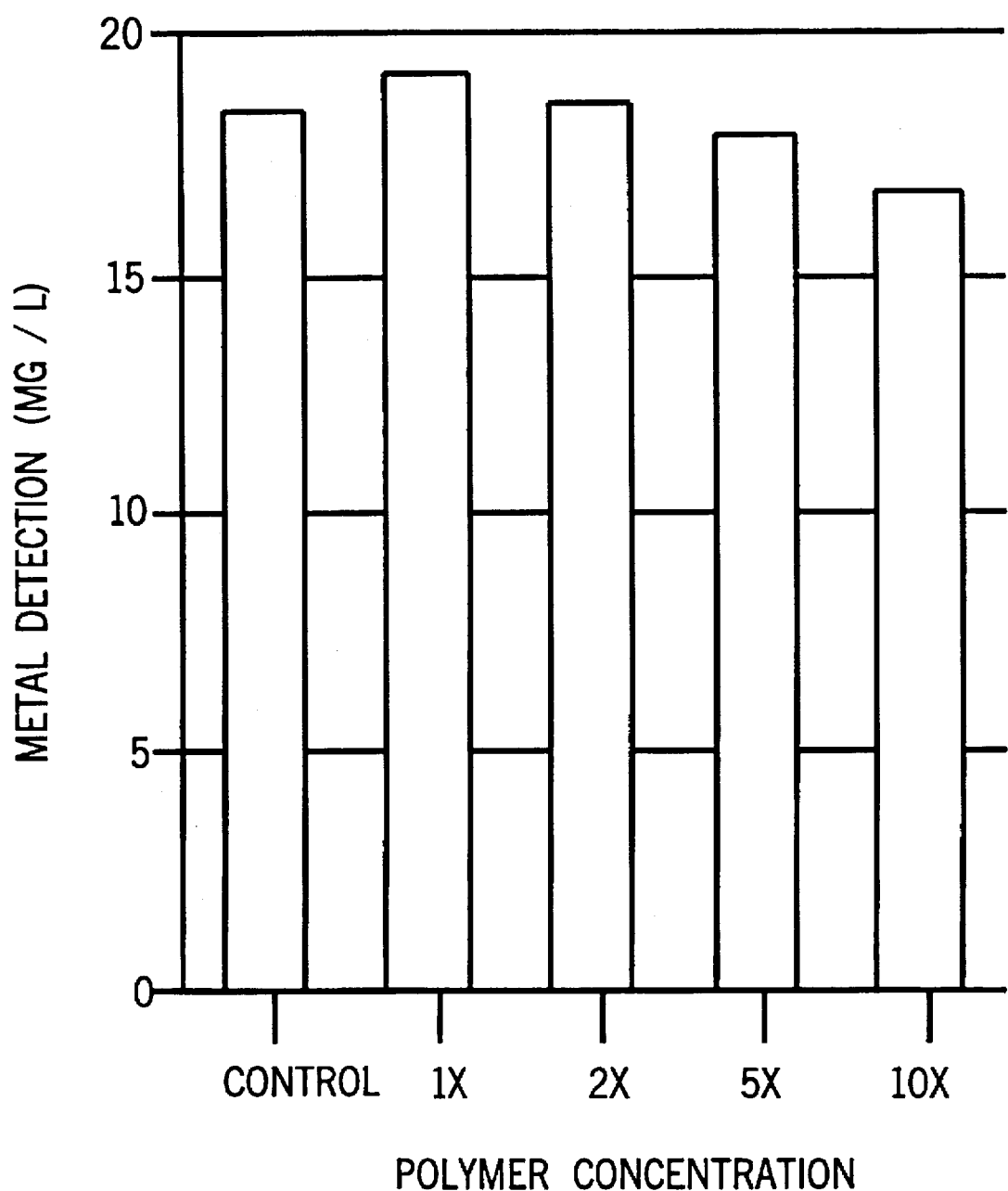
FIG. 3 is a bar graph showing the amount of magnesium detected in a water sample after treatment with various concentrations of an anionic polymer.
Figure 4:
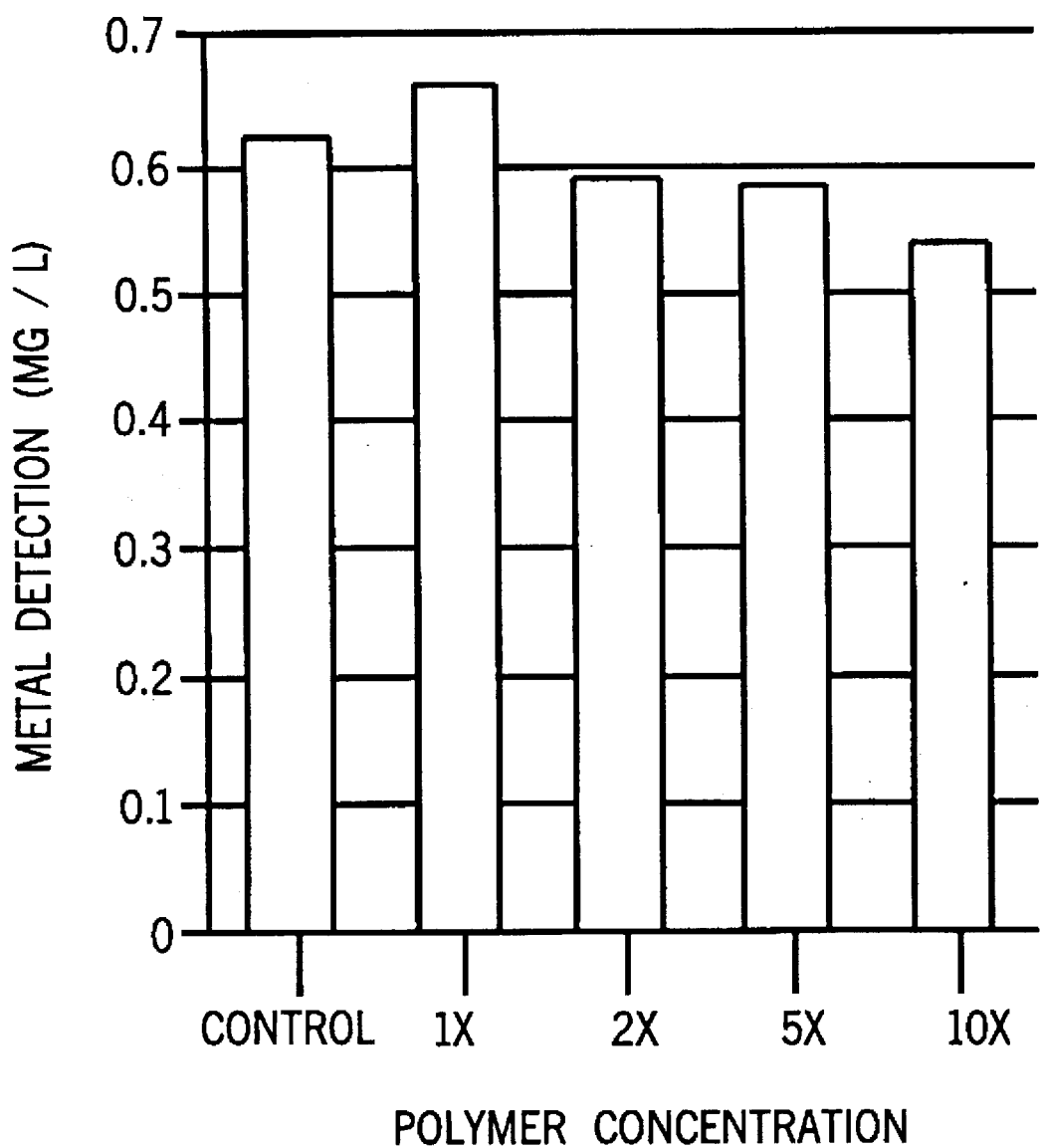
FIG. 4 is a bar graph showing the amount of manganese detected in a water sample after treatment with various concentrations of an anionic polymer.
Figure 5:
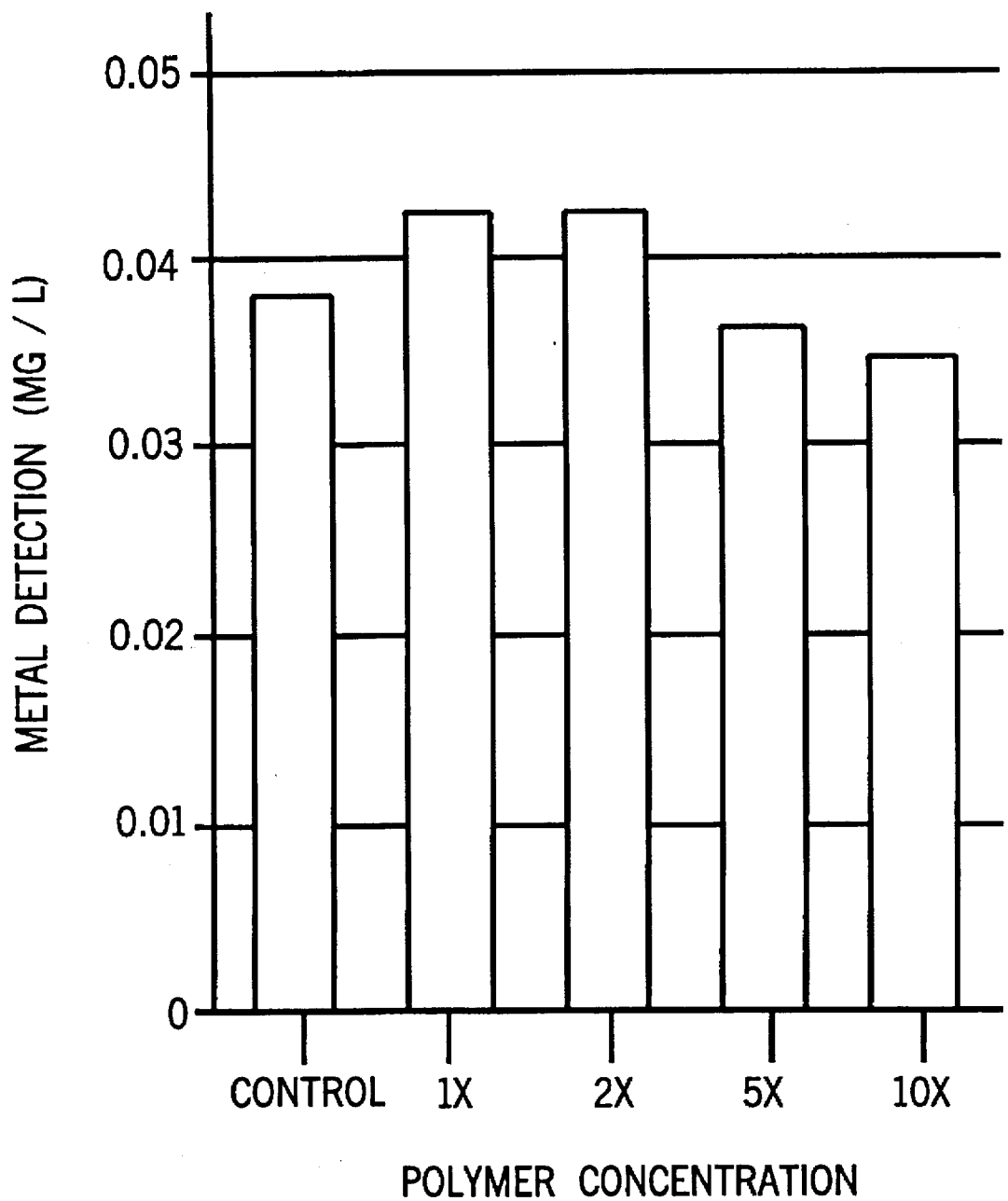
FIG. 5 is a bar graph showing the amount of nickel detected in a water sample after treatment with various concentrations of an anionic polymer.
Figure 6:
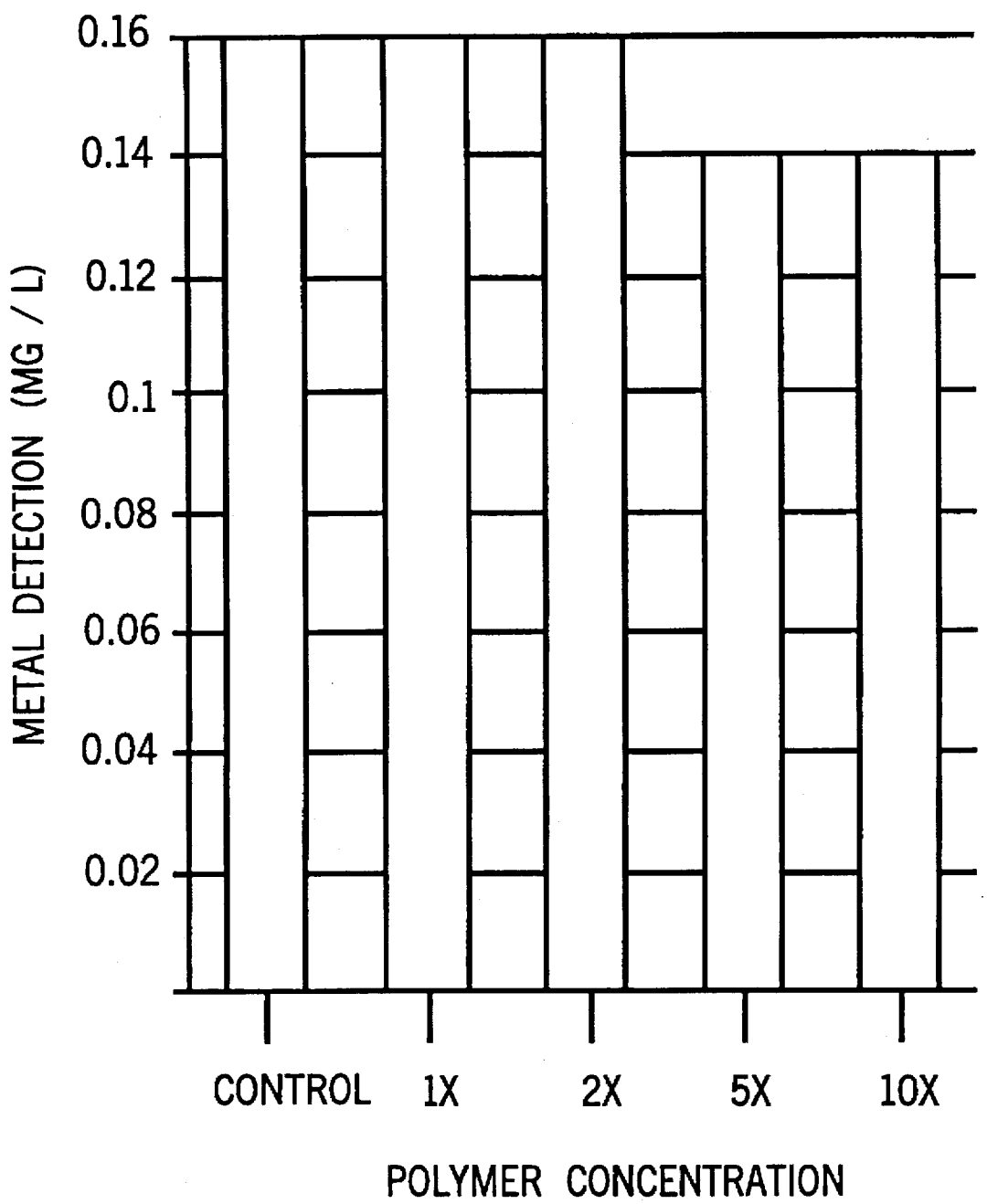
FIG. 6 is a bar graph showing the amount of selenium detected in a water sample after treatment with various concentrations of an anionic polymer.
Figure 7:
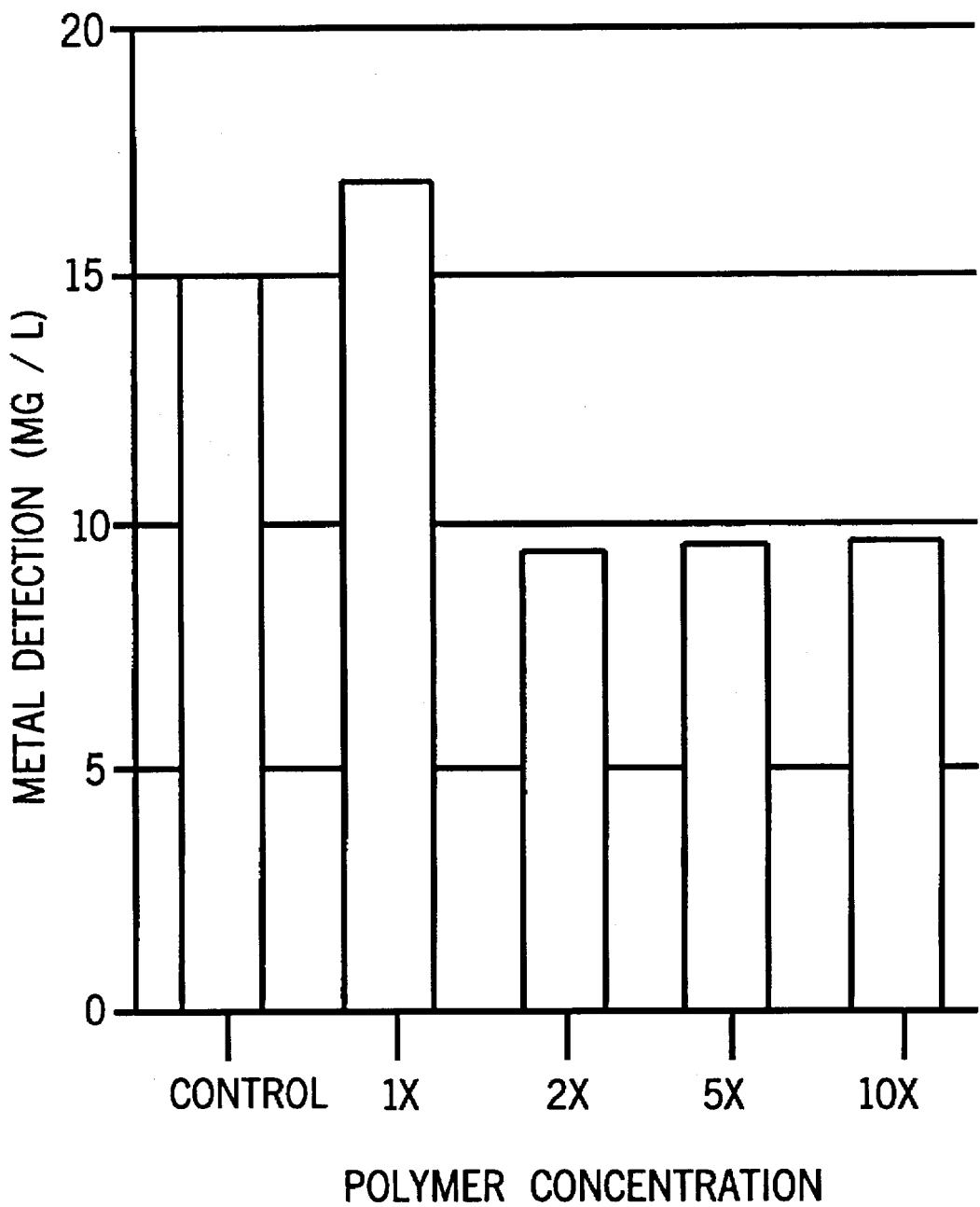
FIG. 7 is a bar graph showing the amount of zinc detected in a water sample after treatment with various concentrations of an anionic polymer.

Referring to FIG. 1, the mine waste water is collected from its varied sources into a main sump from which it is withdrawn for processing at the desired rate. Depending upon the design of the water treatment facility, the size and capability of the facility equipment (e.g. pumps, piping, vats, etc.), components in the waste water, and similar concerns, the concentration of particulates in the waste water is adjusted by adding or subtracting water. Water can be added from any convenient source (including water recycled from the process of this invention), and it can be subtracted or removed by any convenient technique, e.g. filtration.

Once the particulate concentration is adjusted as desired, the waste water is passed to a first static mixer in which the waste water is mixed with an anionic polymer, typically and preferably a sodium salt of a polyacrylate/acrylamide. Preferably sufficient polymer is mixed with the waste water to bind with all the dissolved metal values and accessible metal values on the particulates to form a polymer/metal particle complex. The mixing is conducted under sufficient agitation to maintain the particulates and polymer/metal particle complexes in suspension.

As noted in the preceding paragraph, the polymer used in the process of this invention is an anionic polymer, typically a copolymer comprising units derived from acrylic acid and acrylamide, or a modified polyacrylamide polymer that is grafted with acrylate units. The acrylate and acrylamide units can contain one or more substituents. As here used, "anionic" refers to the acrylate component of the polymer, "acrylic acid" includes methacrylic acid, and "acrylate" includes methacrylate.

Typically, the anionic portion of the polymer comprises at least about 15%, preferably at least 40% and more preferably at least 70%, units derived from one or more acrylates and/or methacrylates. The maximum amount of such units in the polymer does not typically exceed 40%, preferably it does not exceed 70%, and more preferably it does not exceed 90%.

Typically, the polymer is comprised of at least 10%, preferably at least 30% and more preferably at least 60%, units derived from acrylamide. The maximum amount of such units in the polymer does not typically exceed 85%, preferably it does not exceed 60% and more preferably it does not exceed 20%.

Representative polymers that can be used in the practice of this invention include Anco PHPA (37-40% acrylate), SDF 4000 Plus (37-40% acrylate), SDF 2000 (18-20% acrylate), SDF Sum-Vis-Plus (100% acrylate), Alcomer 120L (18-20% acrylate), WDS 550X (35-38% acrylate), Soil Fix IR (15-20% acrylate), Percol E-10, Percol E-24, Percol 155, Percol 1011 (15-20% acrylate), and Percol 156, all manufactured by Allied Colloids; and Super Floc A-836 (15-20% acrylate) and Super Floc A-866 available from Cytec Industries.

The mine waste water containing the polymer/metal particle complex is then transferred to a second static mixer or mixing vessel in which it is mixed with a source of ferric ions, typically and preferably ferric or ferrous chloride (ions from the latter are converted to the former by aerating the waste water). The ferric ions couple with the polymer/metal particle complex to form a ferric/polymer/metal particle complex and with metal values (dissolved or on the particulate) to form ferric/metal particle complexes that tend to participate at a pH between about 5.5 and about 11.5.

From the second static mixer the mine waste water containing the ferric/polymer/metal particle complex and ferric/metal complex is transferred to a rapid mix tank in which it is mixed with a source of hydroxyl ions, e.g. a 20% solution of calcium oxide in water. The amount of hydroxyl ions added to the waste water in the rapid mix tank is only that necessary to render both complexes more susceptible, preferably optimized, to flocculation. The hydroxyl ions are not added for the purpose of adjusting the pH of the slurry although this a minor side effect (the pH is slightly increased, e.g. between about 0.1 and about 0.5) of the addition. The rapid mix tank is of conventional design, and is operated in a conventional manner.

The hydroxylated ferric/polymer/metal particle and ferric/metal complexes are then transferred to a flocculation station in which flocculent is added is sufficient quantity so as to precipitate the complexes. This station is operated such that the flocculated complexes are maintained in suspension until transferred to a settling tank in which the slurry is allowed to separate into a clear, clean effluent and a high density, low toxicity sludge (i.e. a sludge with a solids content in excess of 15, preferably in excess of 25, weight percent based on the total weight of the sludge and in which the metal values are complexed such that these values are, and remain under typical landfill conditions, substantially inert). With appropriately designed and operated equipment, sludge densities in excess of 50% or more can be achieved (as pumped from a clarifier underflow), and this sludge will actually have a measurable slump value such as that for pourable concrete.

Any flocculent with an anionic charge of between about 15 and about 35% and that will precipitate the complexes can be used in the practice of this invention. Nalco 7763 (29% anionic charge), Alloid Chemical WDS EN-03 (15-20% anionic charge) and Golden West Industries 744 (28% anionic charge) are representative. The flocculent is typically added to the waste water containing the complexes by injection at a rate of about 5 mg/l although the rate will vary with the a host of factors including the nature and amount of anionic polymer, the mount of ferric and hydroxyl ions in the system, the size of the metal loading in the waste water, etc.

Hallmarks of this invention are the admixing of an anionic polymer with the waste water, the addition of ferric ions prior to the addition of hydroxyl ions, and the production of a high density sludge. Indeed, the production of such a high density sludge allows a down-scaling of equipment, particularly the settling tank, and this in turn lowers the capital cost of the processing facility. The effluent is clear and reduced in metal value content to the extent that it can be safely discharged to the environment consistent environmental regulations, or recycled to the process or other mine operations.

The invention is further described by the following Example. Unless otherwise indicated, all pans and percentages are by weight.

SPECIFIC EMBODIMENT

Polymer-Enhanced Ferric Chloride Co-Precipitation Water Treatment Process

Heavy metal contaminated water (200 ml) with a pH of between 5.5 and 7.5 was placed into five (5) separate beakers. One of these beakers was a control to which no polymer was added. The other four (4) beakers, however, were used to show the advantageous effects of using an anionic polymer in varying concentrations, namely 1X, 2X, 5X and 10X. The anionic polymer used in this example was Super Floc A-866 (0.25 g/500 ml deionized water). To the 1X beaker, 1 ml of the polymer was added to the metal contaminated water. To the 2X beaker, 2 ml of the polymer was added to the metal contaminated water. To the 5X beaker, 5 ml of the polymer was added to the metal contaminated water. To the 10X beaker, 10 ml of the polymer was added to the metal contaminated water.

After the polymer was added to the metal contaminated water, each solution was stirred at a moderate stirring speed for 3 minutes. Ferric Chloride (1/40 ml of 42% ferric chloride solution) was then added to each beaker and stirred for an additional minute. A Milk of Lime solution (1/40 ml of a 20% milk of lime solution) was then added to each beaker and again stirred for one minute. A flocculent (2 drops of Super Floc A-836 solution comprising 0.25 g polymer/500 ml deionized water) was then added to each beaker and stirred for one minute. The solutions in each beaker were then allowed to settle. The supernate was then filtered using a 0.45 micron filter and the metal values were measured using Atomic Adsorption (AA) or Inductive Coupled Plasma (ICP). The data are reported in Table I and FIGS. 2–8.

| Metal Values Detectable After Polymer Treatment (mg/l) | | | | | |
|---|---|---|---|---|---|
| Metal/ Column Treated | Control | 1× Polymer | 2× Polymer | 5× Polymer | 10× Polymer |
| Cadmium | 0.038 | 0.043 | 0.030 | 0.024 | 0.023 |
| Magnesium | 18.4 | 19.1 | 18.5 | 17.8 | 16.5 |
| Manganese | 0.62 | 0.66 | 0.59 | 0.58 | 0.53 |
| Nickel | 0.038 | 0.042 | 0.042 | 0.360 | 0.034 |
| Selenium | 0.160 | 0.160 | 0.16 | 0.14 | 0.14 |
| Zinc | 15 | 17 | 9.5 | 9.5 | 9.6 |

These data illustrate the desirability of pretreating heavy metal contaminated water with an anionic polymer.

The foregoing description and examples are for the purpose of illustration only, and does not limit the scope of protection which should be accorded this invention.

What is claimed is:

1. An improved process for precipitating both particulate and dissolved metal values from a mine waste water with a pH between about 7 and 11 with a source of hydroxyl ions, a source of ferric ions and a flocculent, the improvement comprising:

A. Mixing with the mine waste water a sufficient amount of anionic polymer to combine with the dissolved and particulate metal values to form a polymer/metal complex, B. Mixing the polymer/metal complex of Step A with a source of ferric ions to form a ferric/polymer/metal complex, C. Mixing the ferric/polymer/metal complex of Step B with a source of hydroxyl ions to form a hydroxylated ferric/polymer/metal complex, D. Mixing sufficient flocculent with the complex of Step C to precipitate the complex, and E. Separating the slurry of Step D into a clean water effluent and a high density, low toxic sludge.

2. The process of claim 1 in which the metal value is at least one of zinc, copper, iron, cadmium, calcium, magnesium, manganese, nickel, and selenium.

3. The process of claim 2 in which the metal values are present in a concentration of between 0.1 and 10,000 mg/l.

4. The process of claim 3 in which the source of ferric ions is ferric chloride.

5. The process of claim 4 in which the source of hydroxyl ions is a solution of calcium oxide.

6. The process of claim 5 in which the flocculent is a polyacrylamide.

7. The process of claim 6 in which the sludge comprises greater than 50% solids.

8. The process of claim 3 in which the anionic polymer is a salt of a polyacrylate/acrylamide.

9. The process of claim 8 in which the anionic polymer comprises at least 60% of units derived from acrylamide.

* * * * *